United States Patent
Mita

(10) Patent No.: US 9,802,490 B2
(45) Date of Patent: Oct. 31, 2017

(54) POWER SUPPLY APPARATUS, POWER SUPPLY SYSTEM, VEHICLE, AND ELECTRONIC APPARATUS

(75) Inventor: Hiroyuki Mita, Saitama (JP)

(73) Assignee: SONY CORPORATION, Tokyo (JP)

( * ) Notice: Subject to any disclaimer, the term of this patent is extended or adjusted under 35 U.S.C. 154(b) by 896 days.

(21) Appl. No.: 13/543,794

(22) Filed: Jul. 7, 2012

(65) Prior Publication Data

US 2013/0015699 A1 Jan. 17, 2013

(30) Foreign Application Priority Data

Jul. 14, 2011 (JP) ................ 2011-155360

(51) Int. Cl.
| | |
|---|---|
| H01F 27/42 | (2006.01) |
| H01F 37/00 | (2006.01) |
| H01F 38/00 | (2006.01) |
| B60L 3/00 | (2006.01) |
| H01J 17/00 | (2006.01) |
| H02J 5/00 | (2016.01) |
| H02J 7/02 | (2016.01) |
| B60L 11/18 | (2006.01) |
| H02J 7/00 | (2006.01) |

(52) U.S. Cl.
CPC .............. B60L 3/00 (2013.01); B60L 11/182 (2013.01); H01J 17/00 (2013.01); H02J 5/005 (2013.01); H02J 7/025 (2013.01); *H02J 7/0042* (2013.01); *Y02T 10/7005* (2013.01); *Y02T 10/7072* (2013.01); *Y02T 90/122* (2013.01); *Y02T 90/14* (2013.01)

(58) Field of Classification Search
CPC .. H02J 5/005; H02J 7/025; H02J 17/00; H02J 7/02; H01F 38/14; B60L 11/182
USPC .......... 307/104, 149, 9.1, 10.2, 64; 320/110, 320/108, 111, 113; 455/25, 44, 20
See application file for complete search history.

(56) References Cited

U.S. PATENT DOCUMENTS

| | | | |
|---|---|---|---|
| 8,487,480 B1* | 7/2013 | Kesler ................ | B60L 11/007 307/104 |
| 2001/0038522 A1* | 11/2001 | Zheng .................. | A63B 9/00 312/223.2 |
| 2008/0265684 A1* | 10/2008 | Farkas ................ | B60L 11/005 307/104 |
| 2010/0176659 A1* | 7/2010 | Aoyama et al. ............. | 307/104 |
| 2011/0074346 A1* | 3/2011 | Hall ...................... | B60L 3/00 320/108 |
| 2011/0095618 A1* | 4/2011 | Schatz .................. | H03H 7/40 307/104 |
| 2012/0139355 A1* | 6/2012 | Ganem .................. | H02J 5/005 307/104 |

FOREIGN PATENT DOCUMENTS

JP 2010-226946 10/2010

* cited by examiner

*Primary Examiner* — Rexford Barnie
*Assistant Examiner* — Jagdeep Dhillon
(74) *Attorney, Agent, or Firm* — Chip Law Group

(57) ABSTRACT

A power transfer unit configured to transfer power using magnetic fields, and a foreign object remover configured to remove a foreign object in the vicinity of a power transfer path when the power is transferred.

10 Claims, 11 Drawing Sheets

POWER SUPPLY APPARATUS, POWER SUPPLY SYSTEM, VEHICLE, AND ELECTRONIC APPARATUS

BACKGROUND

The present disclosure relates to a power supply system in which power is contactlessly supplied (transferred) to a power receiving apparatus such as a vehicle or an electronic apparatus, and relates to a power supply apparatus, a vehicle, and an electronic apparatus which are used in such a power supply system.

In recent years, attention has been paid to power supply systems (contactless power supply systems, wireless charging systems) in which power is contactlessly supplied (transferred) to consumer electronics devices such as cellular phones or portable music players. In these power supply systems, charging can be started by simply placing an electronic apparatus (secondary apparatus) on a charging tray (primary apparatus) without having to insert (connect) the connector of a power supply apparatus, such as an AC adapter, into the electronic apparatus. It is not necessary to connect together the terminals of the electronic apparatus and the charging tray.

In addition to those for electronic apparatuses as described above, there have been proposed power supply systems for contactlessly supplying power to vehicles (electric vehicles) acting as a power receiver (power supply destination). (For example, see Japanese Unexamined Patent Application Publication No. 2010-226946.) For such a power supply system, a vehicle acting as a power supply destination is mainly placed outdoors, while a power supply apparatus is embedded in the ground with its power transfer surface (power supply surface) exposed.

SUMMARY

Meanwhile, in such a power supply system, a foreign object other than an apparatus acting as a power supply destination may be placed on the power transfer surface or the like of a power supply apparatus (in the vicinity of the power transfer path). In particular, when a metallic foreign object is placed, the metallic foreign object may be heated by alternating magnetic fields.

Japanese Unexamined Patent Application Publication No. 2010-226946 proposes a method for detecting a metallic foreign object placed on the power transfer surface to take a measure such as a stop to the power supply operation. However, this method is not enough to avoid the effect of a foreign object as described above and supply power favorably (properly), and a proposal for an improved method is desired.

Accordingly, it is desirable to provide a power supply apparatus that can supply power properly when transferring power using magnetic fields, and a power supply system, a vehicle, and an electronic apparatus.

A power supply apparatus according to an embodiment of the present disclosure includes a power transfer unit that transfers power using magnetic fields; and a foreign object remover that removes a foreign object in the vicinity of a power transfer path when the power is transferred.

A power supply system according to an embodiment of the present disclosure includes one or more power receivers and a power supply apparatus that supplies power to the power receivers. The power supply apparatus includes a power transfer unit that transfers power using magnetic fields, and the power receiving apparatuses each include a power receiving unit that receives power transferred by the power transfer unit. At least one of the power supply apparatus, the power receivers, and an apparatus different from the power supply apparatus and the power receivers includes a foreign object remover that removes a foreign object in the vicinity of a power transfer path when the power is transferred.

A vehicle and electronic apparatus according to an embodiment of the present disclosure each include a power receiving unit that receives power transferred using magnetic fields; and a foreign object remover that removes a foreign object in the vicinity of a power transfer path when the power is transferred.

The power supply apparatus, the power supply system, and the vehicle and electronic apparatus according to the embodiments of the present disclosure each include the foreign object remover that removes a foreign object in the vicinity of the power transfer path when the power is transferred. Thus, the adverse effect of a foreign object other than the power supply destination is avoided.

According to the embodiments of the present disclosure, the power supply apparatus, the power supply system, and the vehicle and the electronic apparatus each include the foreign object remover that removes a foreign object in the vicinity of the power transfer path when the power is transferred. Thus, the adverse effect of a foreign object can be avoided. As a result, power can be supplied properly using magnetic fields.

DETAILED DESCRIPTION OF EMBODIMENTS

Now, an embodiment of the present disclosure and modification thereof will be described with reference to the accompanying drawings. The description will be made in the following order:
1. Embodiment (an example where a repeater device and a foreign object remover are disposed in the primary apparatus)
2. Modifications Modification 1 (an example where a repeater device and a foreign object remover are disposed in the secondary apparatus)

Modification 2 (an example where a repeater device and a foreign object remover are disposed in a repeater device)

Modification 3 (an example where a foreign object remover is disposed in the primary apparatus)

Modification 4 (an example where a foreign object remover is disposed in the secondary apparatus)

Modification 5 (an example where a foreign object remover is disposed in a foreign object remover)

Modification 6 (an example where an electronic apparatus, instead of a vehicle, is used as the secondary apparatus)

Other Modifications

Embodiment

Configuration of Power Supply System 4

Figure 1:
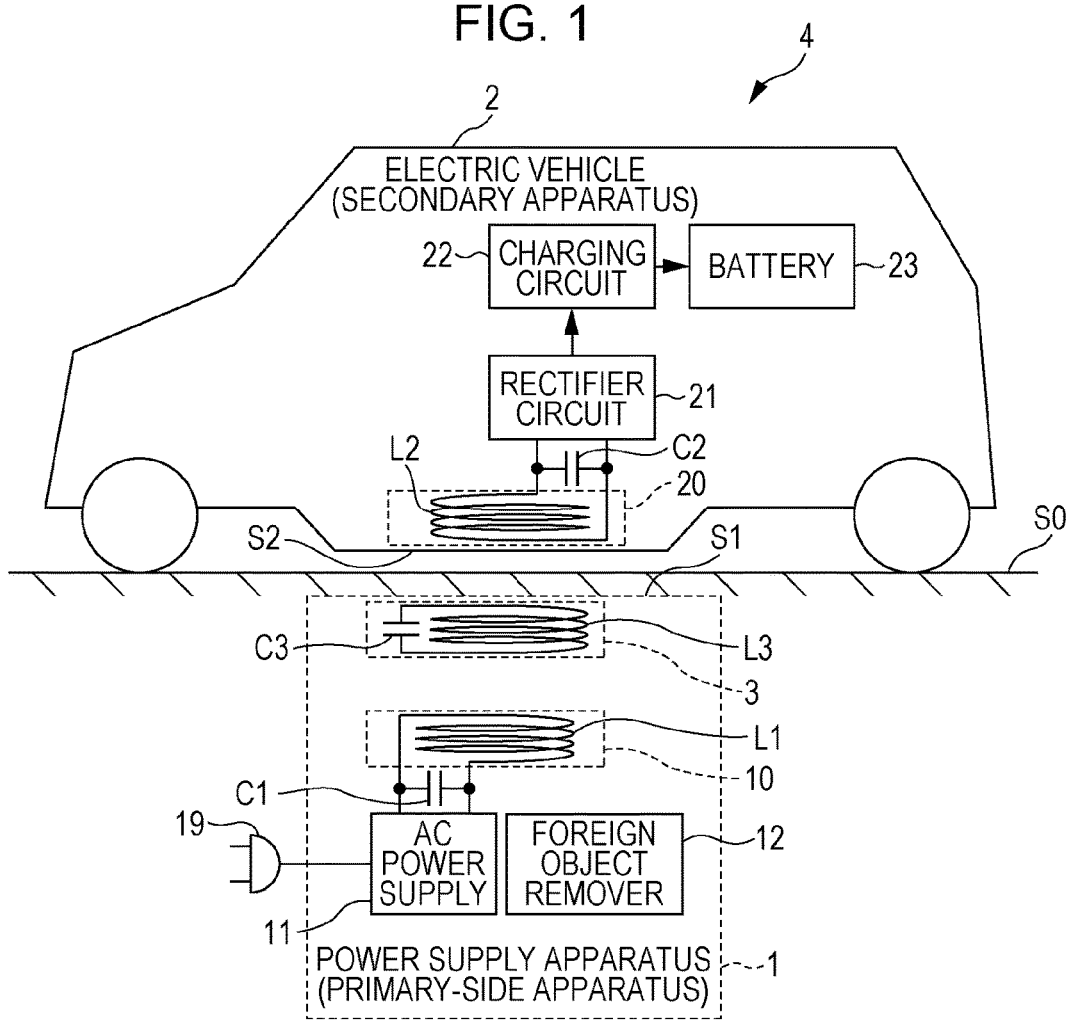
FIG. 1 is a block diagram showing a schematic configuration of a power supply system according to an embodiment of the present disclosure.

FIG. 1 is a block diagram showing a schematic configuration of a power supply system (power supply system 4) according to an embodiment of the present disclosure. The power supply system 4 is a system (contactless power supply system) that transfers power (supplies power) using magnetic fields (using magnetic resonance or the like; same below). The power supply system 4 includes a power supply apparatus 1 (primary apparatus) embedded below a ground surface S0 (in the ground) and one or more vehicles (in this embodiment, one electric vehicle 2; secondary apparatus) placed on the ground surface S0.

In the power supply system 4, when an electric vehicle 2 is placed on (or comes close to) a power transfer surface (power supply surface) S1 of the power supply apparatus 1, power is transferred from the transfer surface S1 of the power supply apparatus 1 to a power receiving surface S2 of the electric vehicle 2.

Power Supply Apparatus 1

As described above, the power supply apparatus 1 transfers power to the electric vehicle 2 using magnetic fields. The power supply apparatus 1 includes a power transfer unit 10, an AC power supply 11, a foreign object remover 12, a power supply plug 19, a resonant capacitor C1 (capacitative element), and a repeater device (repeater) 3.

Figure 2:
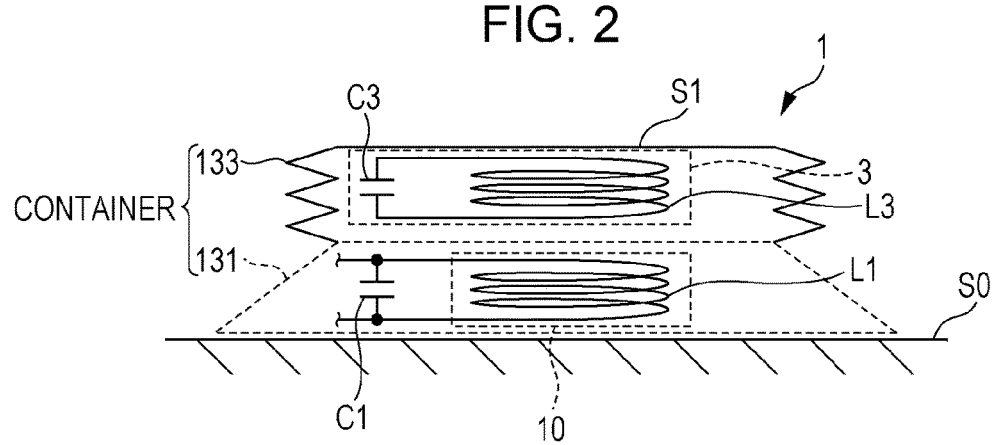
FIG. 2 is a schematic diagram showing a detailed configuration of a main part of the power supply apparatus shown in FIG. 1.

The power transfer unit 10 includes a power transfer coil (primary coil) L1 for transferring power using magnetic fields (generating magnetic flux). By using the power transfer coil L1 and a resonant capacitor C1, the power transfer unit 10 transfers power to the electric vehicle 2 (specifically, a power receiving unit 20 to be discussed later) using magnetic fields. Specifically the power transfer unit 10 has the function of generating magnetic fields (magnetic flux) from the power transfer surface S1 to a power receiving surface S2. For example, as shown in FIG. 2, the power transfer unit 10 is disposed as contained in a container 131 on the ground surface S0. The container 131 is made of rubber or the like and also serves as a supporter for the power transfer unit 10.

The AC power supply (high-frequency power generation circuit) 11 generates predetermined high-frequency power (AC signals) for power transfer using power supplied by, for example, a power supply (not shown) outside the power supply apparatus 1 via the power supply plug 19.

The resonant capacitor C1 is a capacitive element for forming an LC resonator (main resonator, main resonant circuit) with the power transfer coil L1. It is disposed as electrically connected to the power transfer coil L1 in series, in parallel, or in a combination of series and parallel. In this embodiment, the resonant capacitor C1 is electrically connected in parallel to the power transfer coil L1. The LC resonator composed of the power transfer coil L1 and the resonant capacitor C1 performs a resonant operation (main resonant operation) at a resonant frequency (main resonant frequency) f1 which is composed of a frequency approximately the same as or close to the high-frequency power generated by the AC power supply 11. The capacitance of the resonant capacitor C1 is set such that the resonant frequency f1 as described above is obtained. Note that if the resonant frequency f1 as described above is obtained by the main resonant operation using parasitic capacitance components (stray capacitance components) composed of capacitances such as the line capacitance of the power transfer coil L1 and the capacitance between the power transfer coil L1 and a power receiving coil L2 to be discussed later), it is not necessary to dispose the resonant capacitor C1.

The foreign object remover 12 has the function of removing a foreign object in the vicinity of the power transfer path from the power transfer surface S1 to the power receiving surface S2. This function is performed using, for example, the container 133 for a repeater device 3 to be described later. Details of the foreign object remover 12 will be described later (FIG. 4).

By performing a predetermined resonant operation (relay resonant operation), the repeater device 3 can relay power transferred by the power transfer unit 10 (can increase the power supply distance), as will be described later. In this embodiment, the repeater device 3 includes one LC resonator (relay resonator, relay resonant circuit) composed of one relay coil (repeater coil) L3 and one resonant capacitor C3 (capacitive element). The repeater coil L3 functions as, for example, a resonant element that can connect with the power transfer coil L1 in the power transfer unit 10 while generating magnetic resonance with the power transfer coil L1. This will be discussed later. For the resonant capacitor C3 in the repeater device 3 also, it is not necessary to dispose it, for example, if predetermined parasitic capacitance components are used instead of it. A resonant frequency f3 of the LC resonator of the repeater device 3 and the resonant frequency f1($\approx$f2) of the main resonant operation using the power transfer coil L1 are approximately equal to each other ((f1,f2)$\approx$f3), preferably equal to each other ((f1,f2)$\approx$f3) when the power is transferred. The repeater device 3 and the power transfer unit 10 are electrically (physically) insulated from each other.

For example, as shown in FIG. 2, the repeater device 3 is disposed as contained in the container 133 on the ground surface S0 (specifically, on the container 131 containing the power transfer unit 10). The container 133 is also made of rubber or the like and also serves as a supporter for the repeater device 3. The container 133 is in the shape of, e.g., a bellows and can move independently of the power transfer unit 10. Specifically, the repeater device 3 can move in accordance with the positions of the power transfer unit 10 and the power supply destination (a power receiving unit 20 in the electric vehicle 2). Thus, a reduction in transfer efficiency caused by a shift in the relative position is controlled. Details will be described later.

Electric Vehicle 2

The electric vehicle 2 performs a predetermined operation (an operation for performing the functions of a vehicle) on power supplied by the power supply apparatus 1. The electric vehicle 2 includes the power receiving unit 20, a rectifier circuit 21, a charging circuit (voltage stabilization circuit) 22, a battery 23, and a resonant capacitor (capacitive element) C2.

The power receiving unit 20 includes a power receiving coil (secondary coil) L2 for receiving power transferred by the power transfer unit 10 (through magnetic flux). The power receiving unit 20 has the function of receiving power transferred by the power transfer unit 10 of the power supply apparatus 1 using the power receiving coil L2 and the resonant capacitor C2.

The rectifier circuit 21 rectifies power (AC power) supplied by the power receiving unit 20 to generate DC power.

The charging circuit 22 performs a predetermined voltage stabilization operation on the basis of the DC power supplied by the rectifier circuit 21 and charges the battery 23.

The battery 23 stores the amount of power corresponding to charging by the charging circuit 22 and is composed of a battery (secondary battery) such as a lithium ion battery.

The resonant capacitor C2 is a capacitive element for forming an LC resonator (main resonator, main resonant circuit) with the power receiving coil L2 and disposed as electrically connected to the power receiving coil L2 in series, in parallel, or in a combination of series and parallel. In this embodiment, the resonant capacitor C2 is electrically connected in parallel to the power receiving coil L2. The LC resonator composed of the power receiving coil L2 and the resonant capacitor C2 performs a resonant operation at a resonant frequency f2 which is composed of a frequency approximately the same as or close to the high-frequency power generated by the AC power supply 11. That is, the LC resonator composed of the power transfer coil L1 and the resonant capacitor C1 in the power supply apparatus 1 and the LC resonator composed of the power receiving coil L2 and the resonant capacitor C2 in the electric vehicle 2 perform main resonant operations at the respective resonant frequencies that are approximately the same (f1≈f2). The capacitance of the resonant capacitor C2 is set such that the resonant frequency f2 as described above is obtained. Note that if the resonant frequency f2 as described above is obtained by the main resonant operation using parasitic capacitance components composed of capacitances such as the line capacitance of the power receiving coil L2 and a capacitance between the power transfer coil L1 and the power receiving coil L2, it is not necessary to dispose the resonant capacitor C2.

Functions and Advantages of Power Supply System 4

1. Basic Power Transfer Operations

In the power supply system 4, the AC power supply 11 of the power supply apparatus 1 supplies predetermined high-frequency power (AC signals) for power transfer to the power transfer coil L1 and the resonant capacitor C1 (LC resonator) of the power transfer unit 10. Thus, the power transfer coil L1 of the power transfer unit 10 generates magnetic fields (magnetic flux). When the electric vehicle 2 acting as a power supply destination (charging destination) is placed on (or comes close to) the top surface (power transfer surface S1) of the power supply apparatus 1, the power transfer coil L1 of the power supply apparatus 1 and the power receiving coil L2 of the electric vehicle 2 come close to each other in the vicinity of the power transfer surface S1 and the power receiving surface S2.

When the power receiving coil L2 is placed adjacent to the power transfer coil L1 generating magnetic fields (magnetic flux), electromotive force is induced in the power receiving coil L by the magnetic flux being generated by the power transfer coil L1. In other words, magnetic fields are generated by electromagnetic induction or magnetic resonance as linked with the power transfer coil L1 and the power receiving coil L2. Thus, power is transferred from the power transfer coil L1 (primary side, power supply apparatus 1, power transfer unit 10) to the power receiving coil L2 (secondary side, the electric vehicle 2, the power receiving unit 20). At this time, the power supply apparatus 1 performs a main resonant operation (resonant frequency f1) using the power transfer coil L1 and the resonant capacitor C1, while the electric vehicle 2 performs a main resonant operation (resonant frequency f2≈f1) using the power receiving coil L2 and the resonant capacitor C2.

Subsequently, in the electric vehicle 2, the AC power received by the power receiving coil L2 is supplied to a rectifier circuit 221 and the charging circuit 22, which then perform the following charging operation. That is, the rectifier circuit 21 converts the AC power into predetermined DC power and then the charging circuit 22 performs a voltage stabilization operation on the basis of the DC power and charges the battery 23. In this way, the electric vehicle 2 performs the charging operation on the basis of the power received by the power receiving unit 20.

That is, in this embodiment, it is not necessary to connect together the terminals so as to charge the electric vehicle 2. Simply placing the electric vehicle 2 on the power transfer surface S1 of the power supply apparatus 1 (that is, bringing the electric vehicle 2 close to the power transfer surface S1) allows the electric vehicle 2 to start to be charged. (Contactless power supply is performed.) Thus, the load on the user is reduced.

2. Functions of Repeater Device 3

Figure 3A:
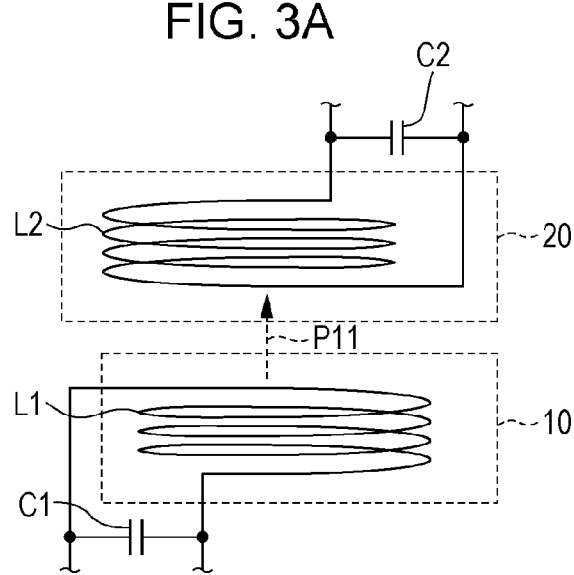
FIGS. 3A and 3B are schematic diagrams showing basic power transfer operations.

When the distance (power supply distance) between the power supply apparatus 1 and the electric vehicle 2 is relatively short, the distance between the power transfer unit 10 and the power receiving unit 20 is also relatively short, for example, as shown in FIG. 3A. Accordingly, contactless power supply can be performed between the power transfer unit 10 and the power receiving unit 20 using magnetic fields (magnetic resonance, etc.). In other words, in this case, even when a contactless power supply operation is directly performed between the power transfer unit 10 and the power receiving unit 20, high transfer efficiency is achieved.

Figure 3B:
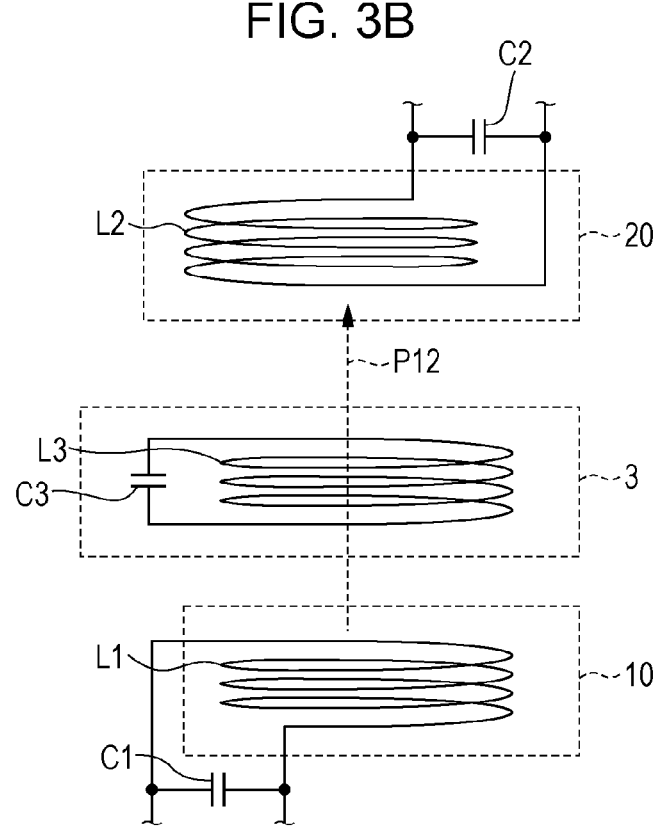

On the other hand, when the distance between the power supply apparatus 1 and the electric vehicle 2 is relatively long, the distance between the power transfer unit 10 and the power receiving unit 20 is also long, for example, as shown in FIG. 3B. Accordingly, when a contactless power supply operation is directly performed between the power transfer unit 10 and the power receiving unit 20, transfer efficiency is reduced due to such as a reduction in magnetic flux density caused by the dispersion of magnetic flux. For this reason, in this embodiment, when the power supply distance is relatively long as described above, a contactless power supply operation is performed using magnetic fields (magnetic resonance, etc.) via the repeater device 3 (relayed), which performs a resonant operation (relay resonant operation) at a resonant frequency f3 which is approximately equal to the resonant frequency f1 (≈f2) of a main resonant operation when the power is transferred. As a result, even when the power supply distance is relatively long, a contactless power supply operation can be performed while high transfer efficiency is maintained. In other words, use of the repeater device 3 as described above allows an increase in the effective power supply distance (transfer distance) when performing contactless power supply. As a result, a contactless power supply operation can be performed with high efficiency in both a case where the electric vehicle 2 is a passenger car, whose power supply distance tends to be relatively short, and a case where the electric vehicle 2 is a large-size car (track, etc.), whose power supply distance tends to be relatively long.

3. Functions, Etc. of Foreign Object Remover 12

Meanwhile, in the power supply system 4, a foreign object other than the apparatus to which power is to be supplied (in this embodiment, the electric vehicle 2) may be placed on the power transfer surface S1 or the like of the power supply apparatus 1 (in the vicinity of the transfer path from the power transfer surface S1 to the power receiving surface S2 when the power is transferred). In particular, when a metallic foreign object is placed, it may be heated by alternating magnetic fields. For this reason, a method is considered for detecting a metallic foreign object placed on the power transfer surface to take a measure such as a stop to the power supply operation. However, this method is not enough to avoid the effect of a foreign object as described above and supply power favorably (properly).

For this reason, in this embodiment, as shown in FIG. 1, the power supply apparatus 1 includes the foreign object remover 12 having the function of removing a foreign object in the vicinity of the power transfer path from the power transfer surface S1 to the power receiving surface S2 when the power is transferred. Thus, for example, even when a foreign object is placed in the power transfer path before starting to perform a power supply operation, the foreign object is excluded from the vicinity of the power transfer path. As a result, when the power supply operation is performed later, the adverse effect of a foreign object (heating of a metallic foreign object, etc.) as described above is avoided.

Figure 4A:
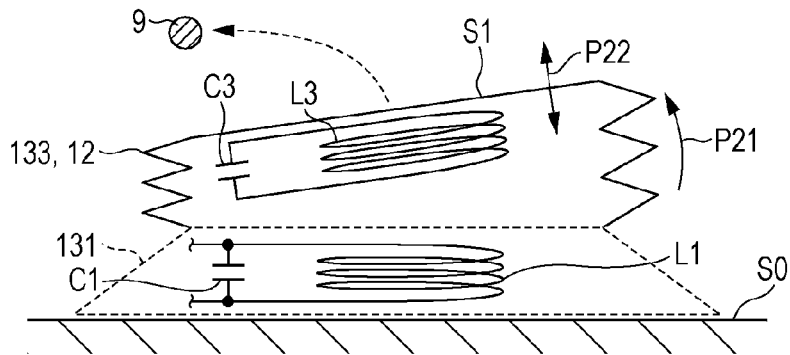
FIGS. 4A to 4D are schematic diagrams showing a specific configuration and functions of a foreign object remover shown in FIG. 1.
Figure 4B:
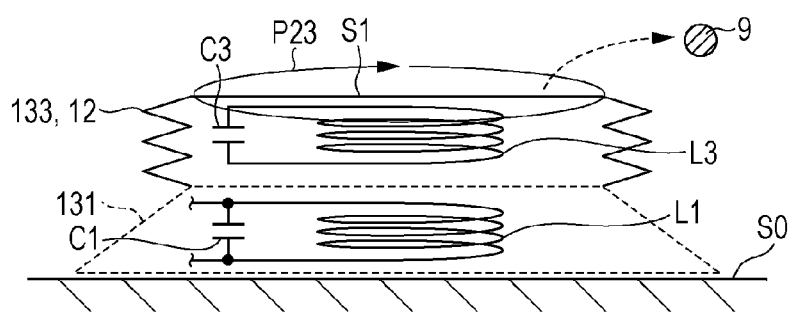

Specifically, in the examples shown in FIGS. 4A and 4B, at least one of a tilt movement, a rotation movement, and a vibration movement made by the container 133 containing the repeater device 3 constitutes the foreign object remover 12. These movements made by the container 133 and the repeater device 3 are realized by an actuator (not shown) which uses a motor, solenoid, or the like.

Specifically, in the example shown in FIG. 4A, the container 133 tilts or vibrates as shown by arrows P21 and P22 in the figure. Thus, a foreign object 9 is removed from the power transfer surface S1 (power transfer path) of the container 133. In the example shown in FIG. 4B, the container 133 rotates as shown by an arrow P23 in the figure (that is, rotates in the horizontal plane). Thus, the foreign object 9 is removed from the power transfer surface S1 (power transfer path) of the container 133 by centrifugal force generated by the rotation.

Figure 4C:
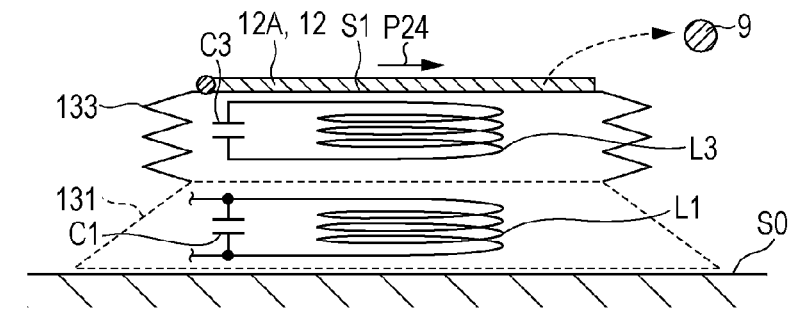

On the other hand, in the example shown in FIG. 4C, a wiper 12A serving as the foreign object remover 12 is disposed on the power transfer surface S1 of the container 133. When the wiper 12A operates on the power transfer surface S1 (an arrow P24 in the figure), the foreign object 9 is wiped out and removed from the power transfer surface S1 (power transfer path).

Figure 4D:
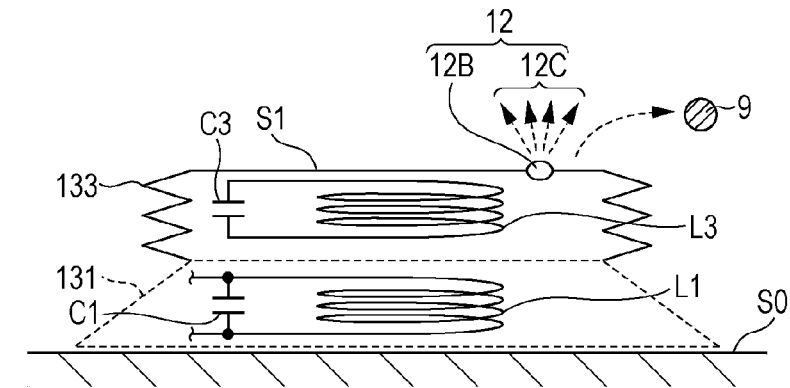

In the example shown in FIG. 4D, a squirt hole 12B (squirt hole of gas) serving as the foreign object remover 12 is disposed on the power transfer surface S1 of the container 133. When gas (in this embodiment, air 12C) is ejected from the squirt hole 12B, the foreign object 9 is removed from the power transfer surface S1 (power transfer path) by a generated wind load.

Figure 5:
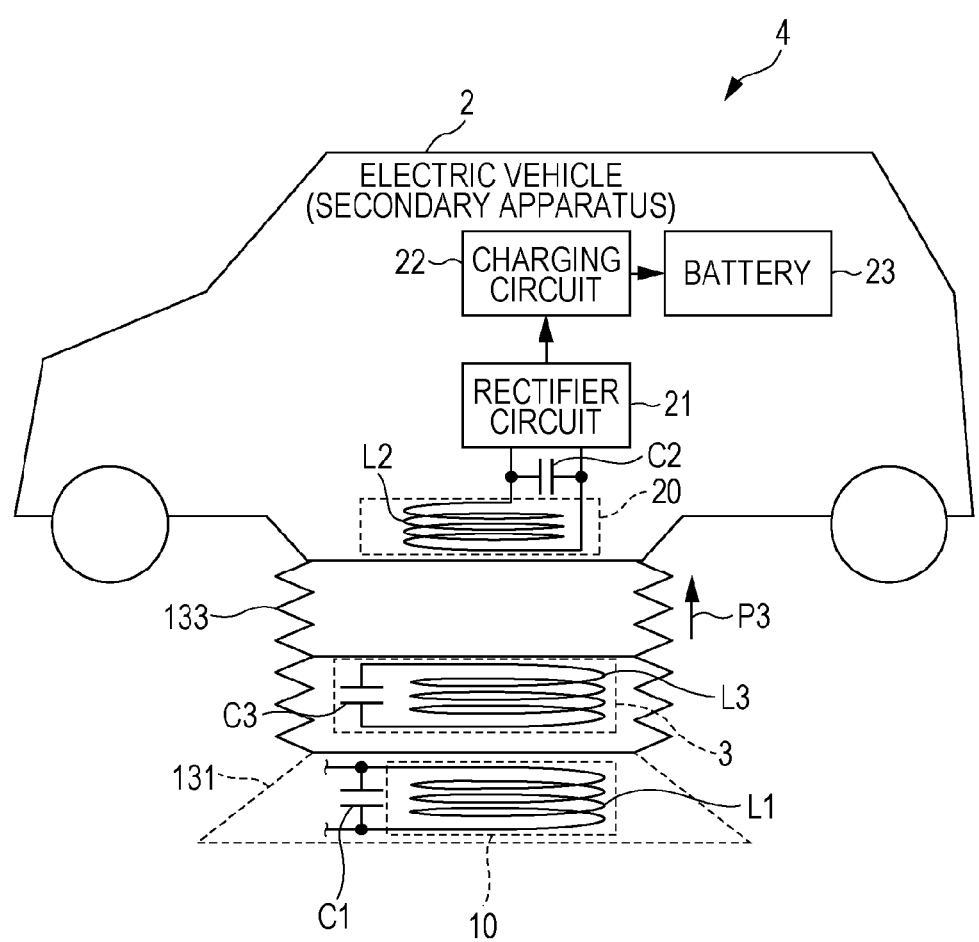
FIG. 5 is a schematic diagram showing a foreign object entry prevention movement made by the container of a repeater device shown in FIG. 2.

For example, as shown in FIG. 5, after starting to perform a power supply operation, the bellows-shaped container 133 may extend toward the power supply destination (electric vehicle 2) until it reaches the destination (an arrow P3 in the figure) and then may function as an enclosure for isolating the vicinity of the power transfer path from the surroundings. Thus, entry of a foreign object (e.g., a small animal) into the vicinity of the power transfer path after starting to perform a power supply operation is avoided (prevented). That is, before as well as after starting to perform a power supply operation, the adverse effect of a foreign object is avoided when the power is transferred.

4. Alignment Function of Repeater Device 3

In the power supply system 4, a misalignment between the power transfer unit 10 and the power receiving unit 20 (a shift in relative position) may reduce transfer efficiency (power supply efficiency). Conceivable countermeasures include a method of informing the user (e.g., the driver) of information on the distance between the power transfer unit 10 and the power receiving unit 20 using communication technology or the like. However, the accuracy of alignment (an improvement in misalignment) performed based on this information largely depends on such as the driving technique of the driver. For this reason, this method is not so effective. Further, thick wires and the like are generally connected to the power transfer unit 10. Accordingly, the entire power transfer unit 10 is difficult to move after installing the power transfer unit 10.

For this reason, in this embodiment, a reduction in transfer efficiency caused by a shift in relative position is controlled using the following method. That is, first, the repeater device 3 and the bellows-shaped container 133 containing the repeater device 3 are configured to be movable independently in accordance with the relative position between the power transfer unit 10 and the power receiving unit 20. Specifically, as described in detail below, the repeater device 3 and the like can make at least one of movements in the horizontal direction, in the vertical direction, and a rotation movement. These movements made by the container 133 and the repeater device 3 are realized by the above-mentioned actuator (not shown). Due to these movements (movements toward proper positions) made by the repeater device 3 and the like, one of the main parameters for determining transfer efficiency, the coupling coefficient (magnetic coupling coefficient), does not easily vary even when the relative position changes. (The coupling coefficient hardly depends on the relative position.) As a result, a reduction in transfer efficiency caused by a shift in relative position is controlled.

Figure 6A:
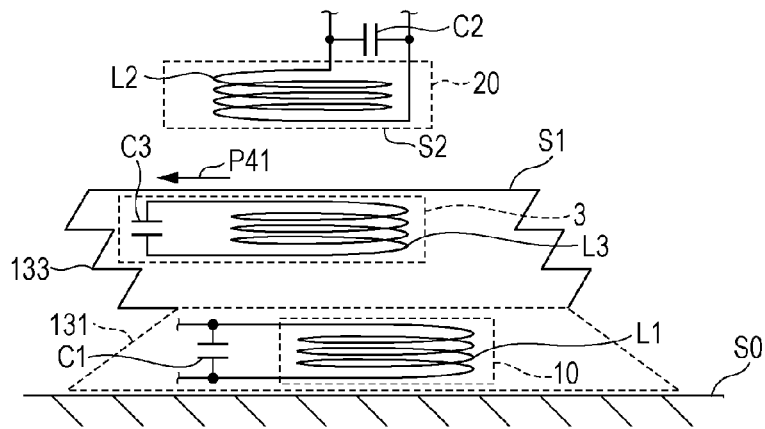
FIGS. 6A to 6C are schematic diagrams showing an alignment movement made by the repeater device shown in FIG. 2.

Specifically, in the example shown in FIG. 6A, the repeater device 3 and the container 133 perform a displacement movement in the horizontal direction (an arrow P41 in the figure). Subsequently, the repeater device 3 relays power transferred by the power transfer unit 10 as described above. As a result, a reduction in transfer efficiency caused by a shift in relative position along the horizontal direction between the power transfer unit 10 and the power receiving unit 20 is controlled.

Figure 6B:
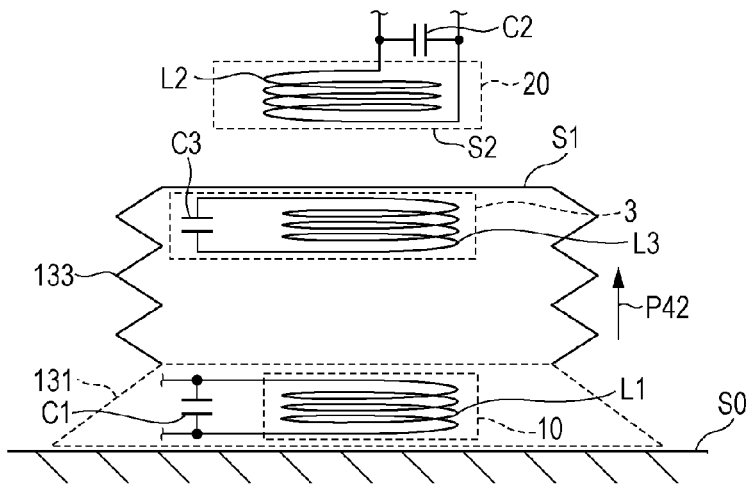

In the example shown in FIG. 6B, the repeater device 3 and the container 133 perform a displacement movement in the vertical direction (an arrow P42 in the figure). Subsequently, the repeater device 3 relays transferred power. As a result, a reduction in transfer efficiency caused by a shift in relative position (an improper relative distance)

along the vertical direction between the power transfer unit 10 and the power receiving unit 20 is controlled. Thus, a contactless power supply operation can be performed with high transfer efficiency, for example, regardless of the size (ground clearance) of the electric vehicle 2.

Figure 6C:
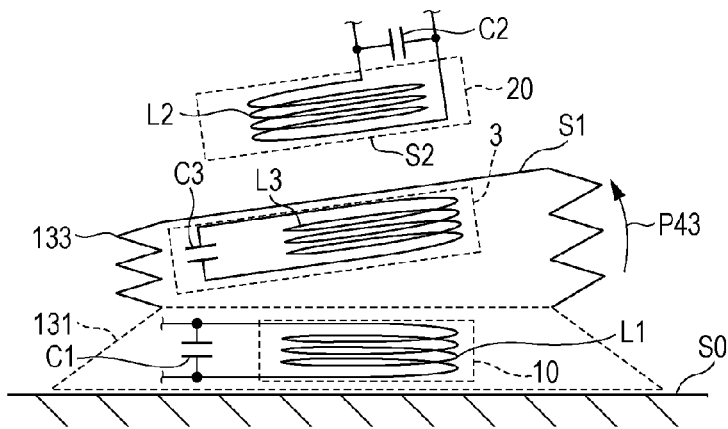

In the example shown in FIG. 6C, the repeater device 3 and the container 133 perform a rotation movement (in this embodiment, a rotation movement in the vertical plane with respect to the ground surface S0). (See an arrow P43 in the figure). Subsequently, the repeater device 3 relays transferred power. As a result, a reduction in transfer efficiency caused by a shift in relative position in the rotation direction between the power transfer unit 10 and the power receiving unit 20 is controlled.

The above-mentioned movements are preferably made in such a manner that the repeater device 3 is located approximately at the midpoint (preferably at the midpoint) between the power transfer unit 10 and the power supply destination (power receiving unit 20). Thus, a reduction in transfer efficiency caused by a shift in relative position is controlled to the greatest degree.

As seen, in this embodiment, the foreign object remover 12 that removes a foreign object in the vicinity of the power transfer path when the power is transferred is disposed. Thus, the adverse effect of a foreign object can be avoided. As a result, power can be supplied properly using magnetic fields. Further, it is not necessary for the user (the driver, etc.) to check (e.g., visually) whether a foreign object exists before or after starting to perform a power supply operation. Thus, user convenience can be enhanced.

Further, if the container 133 containing the repeater device 3 is configured to function also as an enclosure for isolating the vicinity of the power transfer path from the surroundings, the adverse effect of a foreign object when the power is transferred can be avoided before as well as after starting to perform a power supply operation. As a result, power can be supplied more properly using magnetic fields.

Further, the repeater device 3 and the container 133 are configured to be movable independently in accordance with the relative position between the power transfer unit 10 and the power receiving unit 20. As a result, a reduction in transfer efficiency caused by a shift in relative position can be controlled, and power can be supplied more properly.

Modifications

Next, modifications (modifications 1 to 6) of the above-mentioned embodiment will be described. Same components as those in the embodiment are given same reference signs, and description thereof will be omitted as appropriate.

Modification 1

Figure 7:
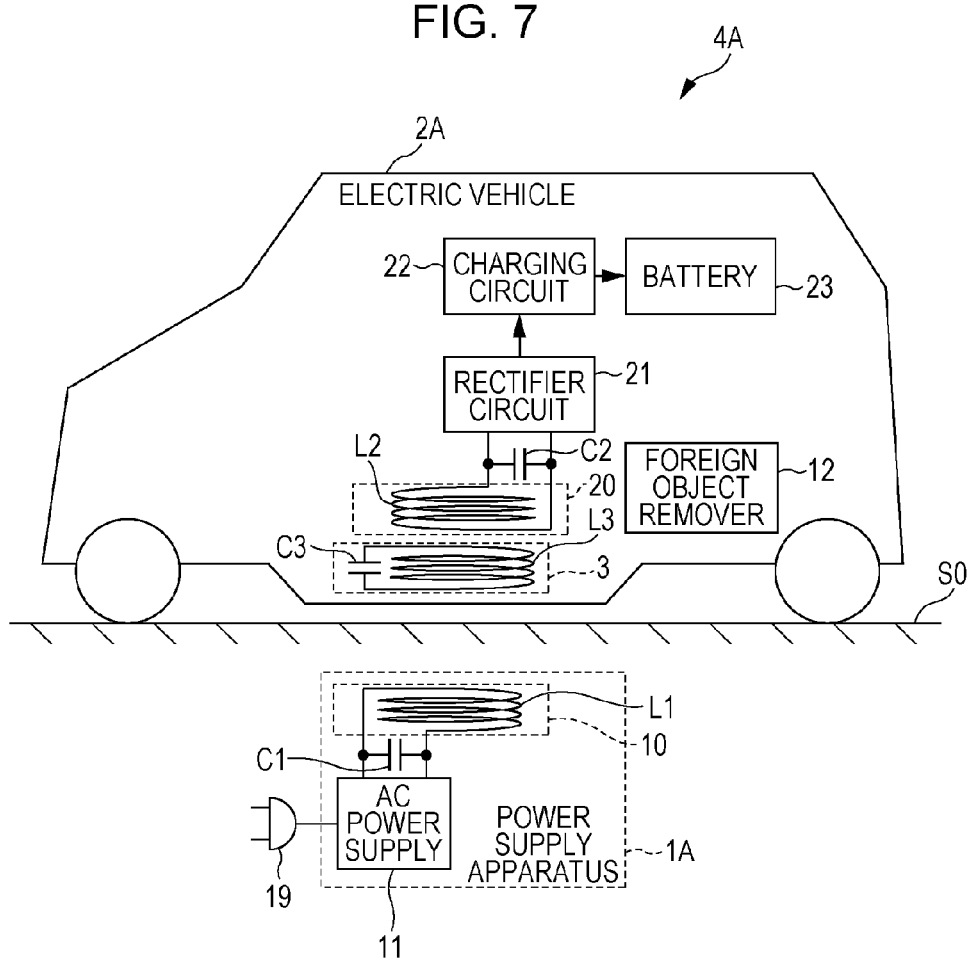
FIG. 7 is a block diagram showing a schematic configuration of a power supply system according to a modification 1.

FIG. 7 is a block diagram showing a schematic configuration of a power supply system (power supply system 4A) according to a modification 1. As with the power supply system 4, the power supply system 4A according to this modification is a system where power is contactlessly transferred using magnetic fields.

The power supply system 4A includes a power supply apparatus 1A (primary apparatus) and one or more vehicles (in this modification, one electric vehicle 2A; secondary apparatus). The power supply apparatus 1A differs from the power supply apparatus 1 in that it does not include (omits) the foreign object remover 12 or repeater device 3; the other components are the same. The electric vehicle 2A differs from the electric vehicle 2 in that it additionally includes a foreign object remover 12 and a repeater device 3; the other components are the same. That is, the power supply system 4A differs from the power supply system 4 in that the foreign object remover 12 and the repeater device 3 are disposed in the electric vehicle (secondary apparatus) rather than in the power supply apparatus (primary apparatus).

This modification thus configured can obtain similar functions and advantages to those of the embodiment.

Modification 2

Figure 8:
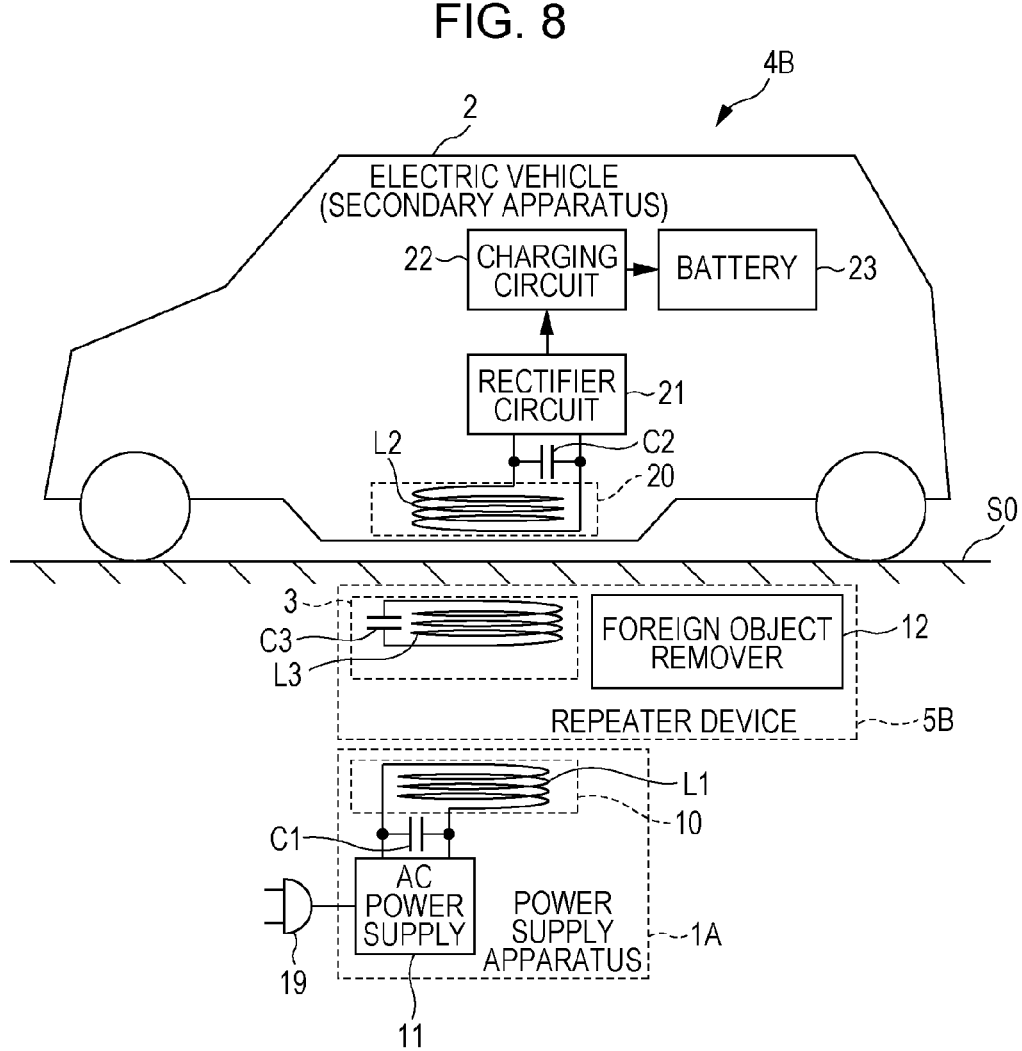
FIG. 8 is a block diagram showing a schematic configuration of a power supply system according to a modification 2.

FIG. 8 is a block diagram showing a schematic configuration of a power supply system (power supply system 4B) according to a modification 2. As with the power supply system 4, the power supply system 4B according to this modification is a system in which power is contactlessly transferred using magnetic fields.

The power supply system 4B includes a power supply apparatus 1A (primary apparatus), one or more vehicles (in this modification, one electric vehicle 2; secondary apparatus), and a relay apparatus 5B including a foreign object remover 12 and a repeater device 3. That is, the power supply system 4B differs from the power supply system 4 in that the foreign object remover 12 and the repeater device 3 are disposed in an apparatus (relay apparatus 5B) different from the power supply apparatus (primary apparatus) and the electric vehicle (secondary apparatus).

This modification thus configured can obtain similar functions and advantages to those of the embodiment.

In this modification, the foreign object remover 12 and the repeater device 3 are disposed in the apparatus (relay apparatus 5B) different from the power supply apparatus and the electric vehicle. As a result, the above-mentioned advantages can be obtained by only adding the relay apparatus 5B to a related-art (existing) non-contact power supply system.

Modifications 3 to 5

Figure 9:
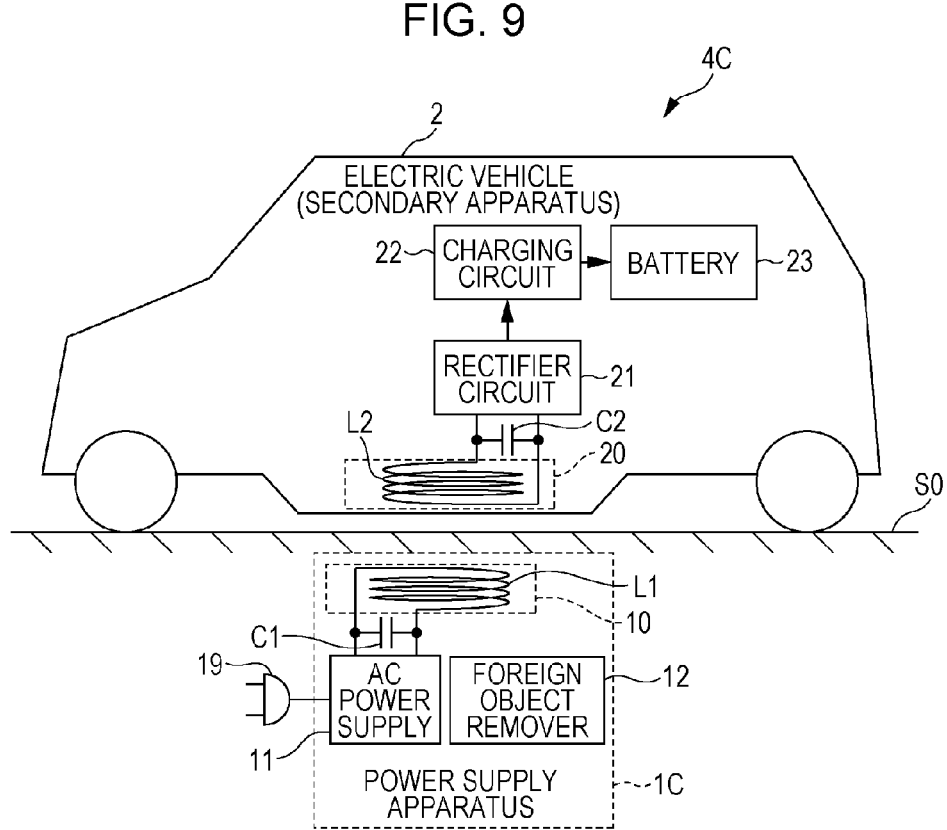
FIG. 9 is a block diagram showing a schematic configuration of a power supply system according to a modification 3.
Figure 10:
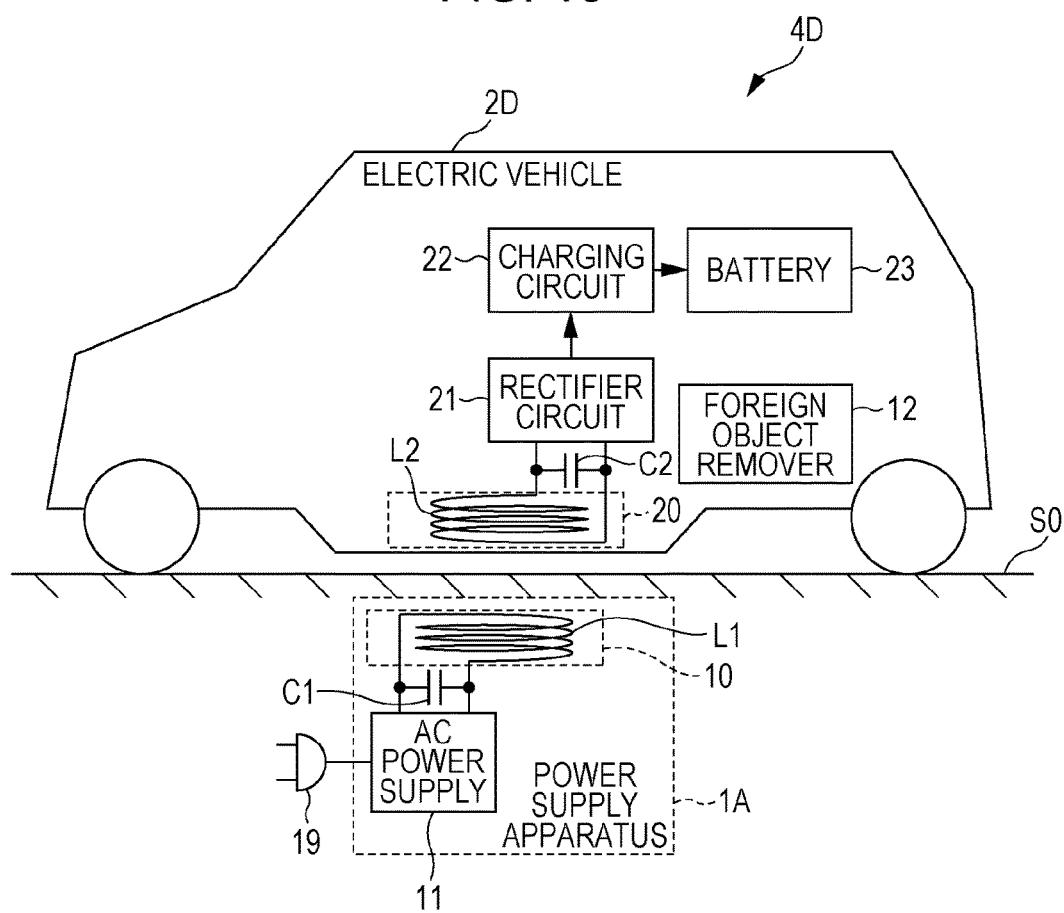
FIG. 10 is a block diagram showing a schematic configuration of a power supply system according to a modification 4.
Figure 11:
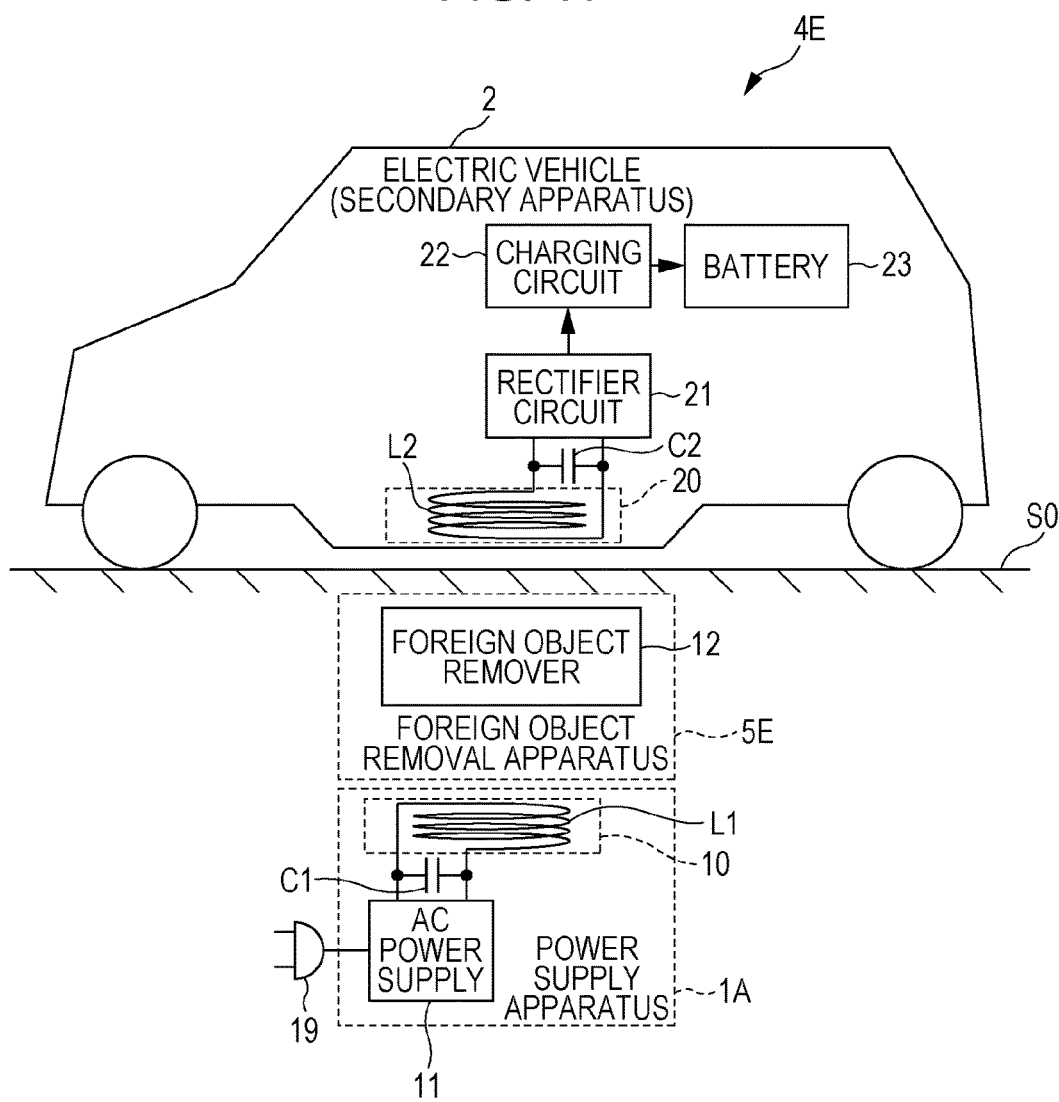
FIG. 11 is a block diagram showing a schematic configuration of a power supply system according to a modification 5.

FIG. 9 is a block diagram showing a schematic configuration of a power supply system (power supply system 4C) according to a modification 3. FIG. 10 is a block diagram showing a schematic configuration of a power supply system (power supply system 4D) according to a modification 4. FIG. 11 is a block diagram showing a schematic configuration of a power supply system (power supply system 4E) according to a modification 5. As with the power supply system 4, the power supply systems 4A, 4D, and 4E according to the modifications 3 to 5 also contactlessly transfer power using magnetic fields.

The power supply system 4C according to the modification 3 shown in FIG. 9 includes a power supply apparatus 1C (primary apparatus) including a foreign object remover 12; and one or more vehicles (in this modification, one electric vehicle 2; secondary apparatus). The power supply system 4D according to the modification 4 shown in FIG. 10 includes a power supply apparatus 1A (primary apparatus) and one or more vehicles (in this modification, one electric vehicle 2D including a foreign object remover 12; secondary apparatus). The power supply system 4E according to the modification 5 shown in FIG. 11 includes a power supply apparatus 1A (primary apparatus), one or more vehicles (in this modification, one electric vehicle 2; secondary apparatus), and a foreign object removal apparatus 5E (an apparatus different from the power supply apparatus (primary apparatus) and the electric vehicle (secondary apparatus)). The power supply systems 4C, 4D, and 4E differ from the power supply systems 4, 4A, and 4B in that they do not include a repeater device 3; the other components are the same.

As seen, a repeater device 3 does not have to be disposed as appropriate so long as at least one of the power supply apparatus, the power receiver (vehicle, etc.) and the apparatus different from the power supply apparatus and the power receiving apparatus includes the foreign object remover 12.

Modification 6

Figure 12:
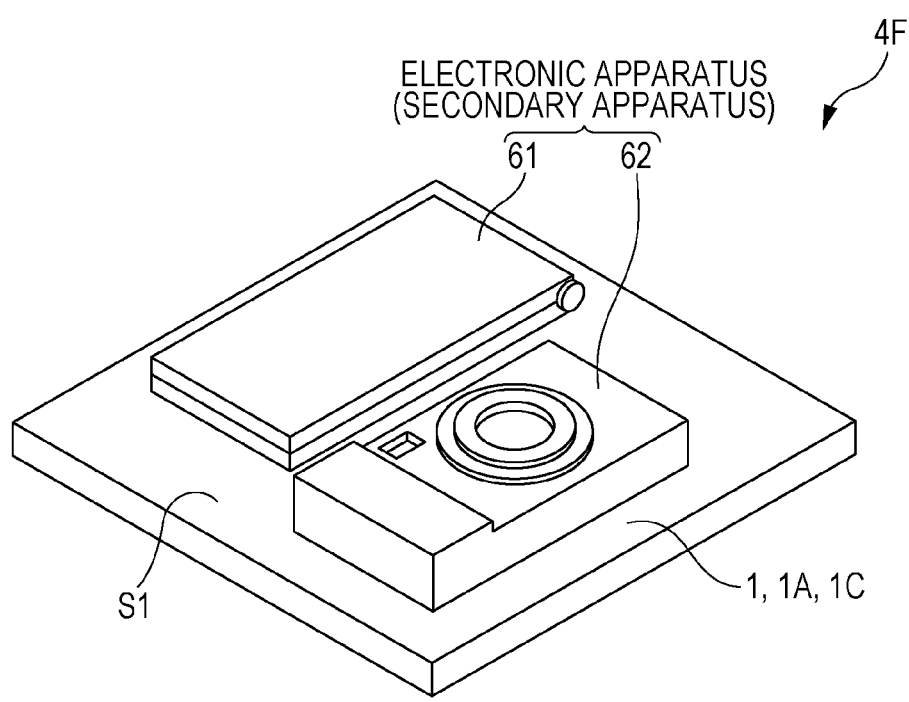
FIG. 12 is a perspective view showing an external configuration of a power supply system according to a modification 6.

FIG. 12 is a perspective view showing an external configuration of a power supply system (power supply system 4F) according to a modification 6. The power supply system 4F according to this modification is also a system in which power is contactlessly transferred using magnetic fields. It includes a power supply apparatus 1 (or power supply apparatus 1A or power supply apparatus 1C; primary apparatus) and one or more electronic apparatuses (in this modification, two electronic apparatuses 61 and 62; secondary apparatuses). The electronic apparatuses 61 and 62 are, for example, stationary electronic apparatuses, typified by television sets, portable electronic apparatuses including a battery, typified by cellular phones and digital cameras, or the like.

In the power supply system 4F, when the electronic apparatuses 61 and 62 are placed on (or come close to) a power transfer surface S1 of a power supply apparatus 1 or the like, power is transferred from the power supply apparatus 1 to the electronic apparatuses 61 and 62. The power transfer surface S1 of the power supply apparatus 1 is the form of a mat (tray) having a larger area than those of the electronic apparatuses 61 and 62 or the like acting as power supply destinations, considering a case where power is transferred to the multiple electronic apparatuses, 61 and 62, simultaneously or in a time-division manner (in sequence).

As seen, even when electronic apparatuses, instead of a vehicle (electric vehicle), are used as power receivers, similar functions and advantages to those of the embodiment can be obtained.

Other Modifications

While the technology of the present disclosure has been described using the embodiment and the modifications thereof, this technology is not limited thereto, and various changes can be made thereto.

For example, while the resonant device includes one LC resonator in the above-mentioned embodiment and the like, the resonant device is not limited thereto and may include, for example, multiple (two or more) LC resonators. While each coil (power transfer coil, power receiving coil, repeater coil) are in the form of a spiral (plane) in the embodiment and the like, each coil may be in the form of, e.g., an α winding, where a spiral coil is disposed as turned back in two layers, a spiral in more than two layers, a helix, where a coil is wound in the thickness direction, or the like. Further, each coil (power transfer coil, power receiving coil, repeater coil) may be a wound coil made of a conductive wire material, as well as a conductive pattern coil formed on a printed board, flexible printed board, or the like. The LC resonator may be composed of a conductive loop rather than an auxiliary coil.

The foreign object remover described in the embodiment and the like has to be disposed in at least one of the power supply apparatus, the power receiver (vehicle, electronic apparatus, etc.), and the apparatus different from the power supply apparatus and the power receiver. Similarly, the repeater device has to be disposed in at least one of the power supply apparatus, the power receiver (vehicle, electronic apparatus, etc.), and the apparatus different from the power supply apparatus and the power receiver.

While the components of the power supply apparatus, the power receiver, and the like have specifically been described in the embodiment and the like, the embodiment and the like do not have to include all the components or may further include other components. For example, the power supply apparatus, the power receiver, or the like may have a communication function or some control function, a display function, a function of authenticating the secondary apparatus, a function of determining whether the secondary apparatus is disposed on the primary apparatus, a function of detecting entry of a metallic foreign object or the like, an impedance matching circuit, or the like.

While the vehicle (electric vehicle) and the electronic apparatuses are used as power receivers in the above-mentioned embodiment and the like, the power receiver is not limited thereto and may be other types of apparatus.

This technology can be configured as follows.

(1) An energy transmitter comprising:
a power transmission coil configured to wirelessly transmit power; and
a foreign object remover configured to displace a foreign object if the foreign object is within a range of a wireless power transmission.

(2) The energy transmitter of (1), wherein the wireless power transmission is defined by a magnetic field generated by the energy transmitter.

(3) The energy transmitter of (1), further comprising: a repeater device configured to (i) move relative to the power transmission coil, and (ii) generate a resonant frequency approximately equal to a resonant frequency generated when power is transmitted,
wherein the relative movement of the repeater device is at least one of a horizontal movement, a vertical movement, and a rotational movement.

(4) The energy transmitter of (1), wherein the foreign object remover is configured to displace the foreign object by generating at least one of a tilt movement, a rotation movement, a vibration movement, a wiping movement, and a discharge of gas.

(5) The energy transmitter of (1), wherein the foreign object remover includes at least one of (i) a wiper configured to cause the foreign object to be displaced relative to the wireless power transmission, and (ii) a gas outlet configured to discharge a gas to cause the foreign object to be displaced relative to the wireless power transmission.

(6) The energy transmitter of (1), further comprising:
a container operable to extend and enclose at least a portion of an area adjacent to the power transmission coil.

(7) The energy transmitter of (1), wherein power transmission coil is configured to wirelessly transmit power to a power receiver unit.

(8) The energy transmitter of (7), wherein the power receiver unit is spaced from the power transmission coil by an electric vehicle.

(9) A power supply system comprising:
a power transfer unit configured to transmit power wirelessly; and
a foreign object remover configured to displace a foreign object if the foreign object is within a range of a wireless power transmission.

(10) The power supply system of (9), further comprising:
a repeater device configured to (i) move relative to the power transfer unit, and (ii) generate a resonant frequency approximately equal to a resonant frequency generated by the power transfer unit when power is transmitted,
wherein the relative movement of the repeater device is at least one of a horizontal movement, a vertical movement, and a rotational movement.

(11) The power supply system of (9), wherein the foreign object remover is operable to cause the foreign object to be displaced relative to the wireless power transmission by generating at least one of a tilt movement, a rotation movement, and a vibration movement.

(12) A method of displacing a foreign object near a power supply system, the method comprising:

providing a power transfer unit configured to transmit power wirelessly to a power receiver unit; and displacing a foreign object via a foreign object remover if the foreign object is within a range of a wireless power transmission.

(13) The method of (12), further comprising:

generating a resonant frequency via a repeater device that is approximately equal to a resonant frequency generated by the power transfer unit when power is transmitted, and moving the repeater device relative to the power transfer unit, the relative movement being at least one of horizontal movement, vertical movement, and rotational movement.

(14) The method of (12), wherein the foreign object is displaced relative to the power transfer by moving the foreign object remover with one of a tilt movement, a rotation movement, a vibration movement, and a wiping movement.

(15) An electric vehicle comprising:

a power receiver unit configured to wirelessly receive power from a power transfer unit via a magnetic field generated between the power receiver unit and the power transfer unit; and a foreign object remover disposed between the power receiver unit and the power transfer unit, the foreign object remover configured to displace a foreign object if the foreign object is within a range of a wireless power transmission.

(16) The electric vehicle of (15), further comprising:

a repeater device configured to generate a resonant frequency approximately equal to a resonant frequency generated by the power transfer unit when power is transferred.

(17) The electric vehicle of (15), wherein the foreign object remover is configured to displace the foreign object by generating one of a tilt movement, a rotation movement, a vibration movement, a wiping movement, and a discharge of gas.

(18) An energy receiver comprising:

a power receiving coil configured to wirelessly receive power; and a foreign object remover configured to displace a foreign object if the foreign object is within a range of a wireless power transmission.

(19) The energy receiver of (18), further comprising:

a repeater device configured to (i) move relative to the power receiving coil, and (ii) generate a resonant frequency approximately equal to a resonant frequency generated when power is transmitted, wherein the relative movement of the repeater device is at least one of a horizontal movement, a vertical movement, and a rotational movement.

(20) The energy receiver of (18), wherein the foreign object remover is configured to displace the foreign object by generating at least one of a tilt movement, a rotation movement, a vibration movement, a wiping movement, and a discharge of gas.

The present disclosure contains subject matter related to that disclosed in Japanese Priority Patent Application JP 2011-155360 filed in the Japan Patent Office on Jul. 14, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An energy transmitter, comprising:
   a first power transmission coil configured to wirelessly transmit power;
   a first container that contains the first power transmission coil, the first container being configured to move relative to a base surface so as to move the first power transmission coil relative to the base surface; and
   a second container that contains a second power transmission coil, a top portion of the second container is connected to a bottom portion of the first container,
   wherein the first container is configured to move based on a relative position between the second power transmission coil and a power receiver unit.

2. The energy transmitter of claim 1, wherein the wireless power transmission is defined by a magnetic field generated by the energy transmitter.

3. The energy transmitter of claim 1,
   wherein the second power transmission coil is configured to transmit power to the first power transmission coil, the first power transmission coil is configured to retransmit the power transmitted to it, and
   the first power transmission coil is configured to move relative to the second power transmission coil, the movement being at least one of a horizontal movement, a vertical movement, or a rotational movement.

4. The energy transmitter of claim 1, further comprising a foreign object remover configured to displace a foreign object on a top portion of the first container by generating at least one of a tilt movement, a rotation movement, a vibration movement, a wiping movement, or a discharge of gas.

5. The energy transmitter of claim 4, wherein the foreign object remover includes at least one of (i) a wiper configured to cause the foreign object to be displaced relative to the wireless power transmission, and (ii) a gas outlet configured to discharge a gas to cause the foreign object to be displaced relative to the wireless power transmission.

6. The energy transmitter of claim 1, wherein the first power transmission coil is further configured to wirelessly transmit power to the power receiver unit.

7. A power supply system comprising the energy transmitter of claim 1.

8. The power supply system of claim 7, wherein
   the second power transmission coil is configured to transmit power to the first power transmission coil, the first power transmission coil configured to retransmit the power transmitted to it, and the first power transmission coil is configured to move relative to the second power transmission coil, the movement being at least one of a horizontal movement, a vertical movement, or a rotational movement.

9. The power supply system of claim 7, comprising a foreign object remover configured to displace a foreign object relative to the wireless power transmission by generating at least one of a tilt movement, a rotation movement, or a vibration movement.

10. The energy transmitter of claim 1, wherein the first container, in which the first power transmission coil is housed, is disposed on the second container.

* * * * *